M. Judd,
Sash Fastener.
No. 104,465.  Patented June 21, 1870.
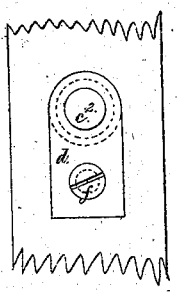
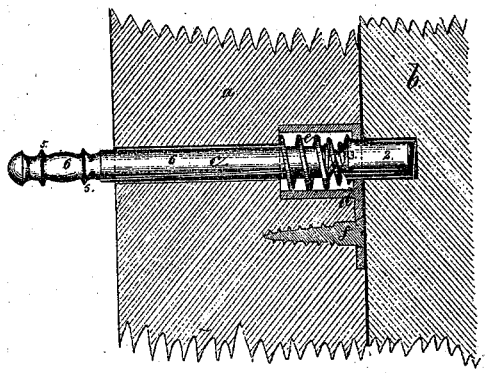
Morton Judd
Witness,
Charles Ives, Jr.
Charles Ives,

UNITED STATES PATENT OFFICE.

MORTON JUDD, OF NEW HAVEN, CONNECTICUT.

IMPROVEMENT IN SPRING-BOLTS FOR WINDOWS.

Specification forming part of Letters Patent No. 104,465, dated June 21, 1870.

*To all whom it may concern:*

Be it known that I, MORTON JUDD, of New Haven, in the State of Connecticut, have invented and made an Improvement in Spring Window-Bolts; and the following is declared to be a correct description thereof.

Spring-bolts have heretofore been made for windows. The same are generally contained in a sheet-metal case that is driven into a hole bored in the sash. Bolts of this kind are not durable, the sheet-metal case is liable to bend, the spring to bind or become displaced, and the bolt to break because of not being properly supported at the outer edge of the sash.

My invention is made for obviating the foregoing difficulties and others that will be hereinafter named.

In the drawings, Figure 1 is a section of part of a sash-frame and casing, showing my spring window-bolt introduced therein, and Fig. 2 is an end view of the bolt and socket.

The sash-mullion $a$ and casing $b$ are prepared to receive the window-bolt, as hereinafter named. The bolt $c$ is made with a head, 2, a collar, 3, to prevent the bolt passing out of the socket $d$, a collar, 4, around which the end of the spring $e$ clasps, and collars 5 5 around the end of the shank portion 6 of said bolts. The socket $d$ is made with a flange, through which the screw $f$ is passed. The mullion $a$ is to be bored with a hole of a size and depth to receive the socket $d$, the flange of which is to be let in flush. The hole that is bored through the mullion $a$ is of a size to pass the collars 5 5. If the collars 5 were of the same diameter as the shank 6, the carpenter in fitting the bolt in place, might bore a hole that would not be sufficiently large to prevent the bolt being obstructed in its movement by the swelling of the wood by moisture. To guard against this contingency, the collars 5 are made of a larger diameter than the shank 6, so that when the hole is bored of a size to allow these collars to pass through, there will be ample room for the free movement of the shank 6. If the spring $e$ were not attached by the collar 4 to the bolt $c$, it would be liable to be lost or might be improperly introduced. By clasping one end around the bolt between the collar 4 and head 2, the spring is connected to said bolt; but the bolt and spring are sufficiently free to assume their proper positions in the socket $d$, and the spring $e$, having a base of larger diameter than the end that connects with the bolt, is not liable to work into the hole through which the bolt passes. The socket $d$ becomes a firm support to the bolt end 2, and sustains said bolt against the sudden shocks to which it is subjected in the movement of the window-sash.

I claim as my invention—

The window-bolt $c$, made with the collars 3, 4, and 5, for the purposes specified, and the head 2 of said bolt, sliding in the socket $d$, as projected by the spring $e$, as set forth.

Signed by me this 21st day of March, A. D. 1870.

MORTON JUDD.

Witnesses:
CHARLES IVES,
CHARLES IVES, Jr.